(12) United States Patent
Subramaniam (10) Patent No.: US 8,364,841 B2
(45) Date of Patent: Jan. 29, 2013

(54) XML OVER TCP MANAGEMENT PROTOCOL WITH TUNNELED PROXY SUPPORT AND CONNECTION MANAGEMENT

(75) Inventor: Narayanan Subramaniam, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 1082 days.

(21) Appl. No.: 11/423,950

(22) Filed: Jun. 13, 2006

(65) Prior Publication Data

US 2006/0288092 A1 Dec. 21, 2006

Related U.S. Application Data

(60) Provisional application No. 60/691,070, filed on Jun. 16, 2005.

(51) Int. Cl.
*G06F 15/173* (2006.01)
*G06F 11/00* (2006.01)
*H04J 3/16* (2006.01)

(52) U.S. Cl. ........ 709/238; 709/220; 709/224; 370/251; 370/470

(58) Field of Classification Search .................. 709/220, 709/238
See application file for complete search history.

(56) References Cited

U.S. PATENT DOCUMENTS

| | | | | |
|---|---|---|---|---|
| 7,376,080 | B1* | 5/2008 | Riddle et al. ............. | 370/229 |
| 7,463,648 | B1* | 12/2008 | Eppstein et al. ............ | 370/468 |
| 7,512,649 | B2* | 3/2009 | Faybishenko et al. ....... | 709/201 |
| 7,599,283 | B1* | 10/2009 | Varier et al. .............. | 370/216 |
| 2002/0023210 | A1* | 2/2002 | Tuomenoksa et al. ....... | 713/161 |
| 2002/0091859 | A1* | 7/2002 | Tuomenoksa et al. ....... | 709/245 |
| 2003/0110276 | A1* | 6/2003 | Riddle ................. | 709/230 |
| 2004/0116119 | A1* | 6/2004 | Lewis et al. .............. | 455/435.1 |
| 2004/0143665 | A1* | 7/2004 | Mace et al. .............. | 709/227 |
| 2004/0261116 | A1* | 12/2004 | Mckeown et al. ........... | 725/109 |
| 2004/0268148 | A1* | 12/2004 | Karjala et al. ............ | 713/201 |
| 2005/0015624 | A1* | 1/2005 | Ginter et al. ............ | 713/201 |
| 2005/0120160 | A1* | 6/2005 | Plouffe et al. ........... | 711/1 |
| 2006/0031407 | A1* | 2/2006 | Dispensa et al. ........... | 709/219 |
| 2006/0037072 | A1* | 2/2006 | Rao et al. ............... | 726/14 |
| 2006/0236095 | A1* | 10/2006 | Smith et al. ............. | 713/153 |

OTHER PUBLICATIONS

J. Sathyan et al., "Defining an Optimized Management Protocol for Next Generation Packet Networks", Wireless Pervasive Computing, 2006 1st International Symposium on, IEEE, pp. 1-6, Jan. 18, 2006.
"New Management Interface: PRC, XML-RPC", p. 1, at http://www.iptel.org/rpc_xml_rpc.
D. Shin et al., "XNMP-XML Management Protocol over VoIP Networks", Proceedings of the Sixith International Conference on Software Engineering, pp. 208-213 (SNPD/SAWN 2005).
"WS-MAN-XML Management Protocol" as defined by Microsoft Corporation at http://msdn2.microsoft.com/en-us/library/aa384470.aspx.

* cited by examiner

*Primary Examiner* — Ranodhi Serrao
*Assistant Examiner* — Muktesh G Gupta
(74) *Attorney, Agent, or Firm* — North, Weber & Baugh LLP; W. Douglas Carothers; David L. Soltz (57) ABSTRACT

Network elements, which are network nodes in a transmission network, implement a proprietary XML agent which supports an XML over TCP network management protocol. The protocol permits tunneling of proxy management traffic, with connection management support, to a privately addressed subtending network element. This tunneling is performed via a publicly addressable gateway network element device without the need for configuration at the element management system software application relative to the subtending network element.

18 Claims, 6 Drawing Sheets

| Start of Frame 401 | Control Flag 402 | Version 403 | Payload Length 404 | Payload Type 405 | Event Number Sequence 406 | Proxy IP 407 | Proxy Port 408 | Target IP 409 | Target Port 410 | Sub Channel ID 411 | Payload in XML 412 | End of Frame 413 |

XML OVER TCP MANAGEMENT PROTOCOL WITH TUNNELED PROXY SUPPORT AND CONNECTION MANAGEMENT

CROSS REFERENCE TO RELATED PATENT APPLICATIONS

This application claims priority to U.S. Provisional Application Ser. No. 60/691,070, entitled "XML over TCP Management Protocol with Tunneled Proxy Support and Connection Management," filed Jun. 16, 2005, which application is incorporated herein by reference in its entirety.

BACKGROUND

A. Technical Field

The present invention relates generally to network management, and more particularly, to the application of Extended Markup Language ("XML") over Transmission Control Protocol ("TCP") management protocol in communication networks.

B. Background of the Invention

In a telecommunication or data communication network system, various network elements ("NEs") are connected for communicating information or messages from one NE to another. The connection between these NEs may be logical or physical. Standard protocols are used to enable these NEs to communicate. Apart from these standard protocols, a management application is also required in order to configure these elements NEs and monitor the communication process.

A typical management application for a communication network may conFig. traffic circuits, or it may monitor the NEs to check for any fault occurrence in the equipment and subsequently employ the corrective actions accordingly from a central management station. Some management applications use the TCP/IP protocol to transport management data in the form of discrete packets, in which the Internet Protocol ("IP") provides the actual routing and delivery of data and the Transmission Control Protocol ("TCP") keeps track of the packets for the reliable transport of data through the Internet.

As part of NE management, the network operator may directly communicate with and manage an NE from a Network Operation Centers ("NOC"). In a long-haul communications network having a large number of concatenated NEs which are privately addressed within the network, it may so happen that management messages may be able to reach these destination NE's only via tunneling through one or more publicly IP addressable NE's, also termed as Gateway Network Elements ("GNEs").

Figure 1:
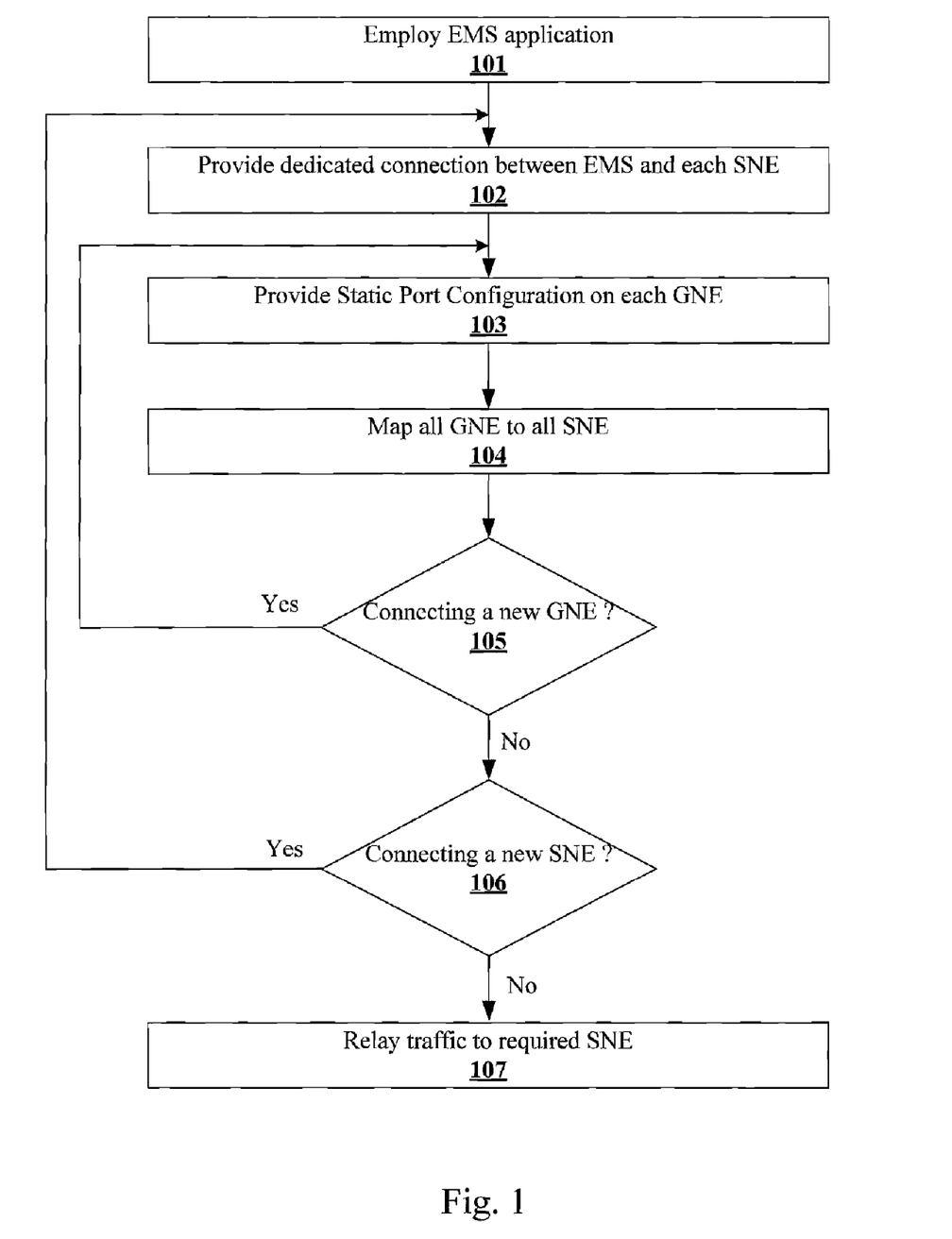
FIG. 1 illustrates a prior art method for relaying traffic to a network element using static port configuration.

FIG. 1 is a flowchart illustrating an approach for the management of a large number of NEs within a network. In particular, an Element Management System ("EMS") application is employed 101 and dedicated connections between the EMS and these privately addressed NE's, also termed as subtending network elements ("SNEs"), are maintained 102. A static port configuration on each GNE device is maintained 103 in order to relay traffic to a particular SNE device. In order to operate properly, this approach requires all GNE devices to maintain the static mapping to all SNE devices in the network 104, which is unwieldy and not scalable. Furthermore, the port assignment is required to be configured and maintained by a network administrator, which is prone to error. Any addition of new SNE or GNE devices 105, 106 further requires updating of coordinated configuration at all the GNE devices. Furthermore, each SNE device requires a separate dedicated connection (direct or indirect) to the EMS.

Figure 2:
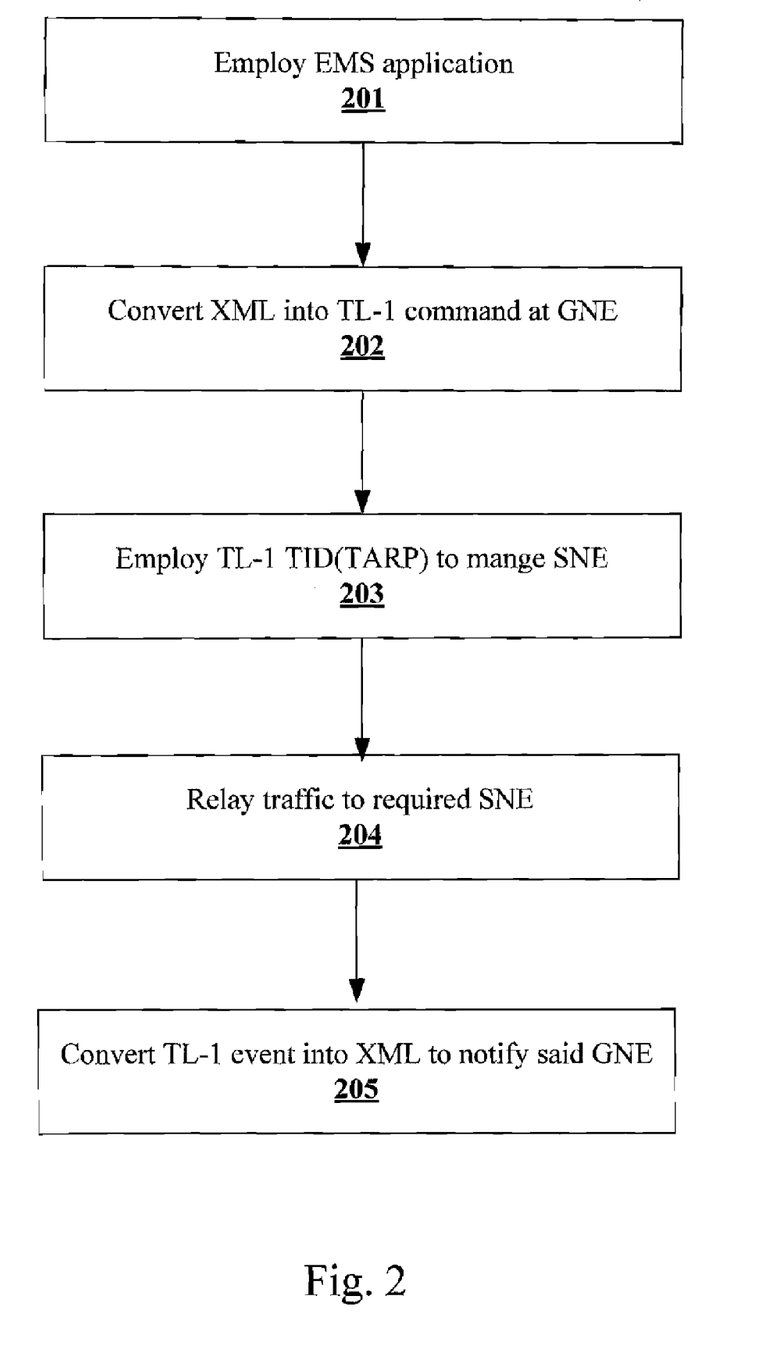
FIG. 2 illustrates another prior art method for relaying traffic to a network elements using TL-1.

FIG. 2 is a flowchart illustrating another management approach that employs an EMS application 201 wherein a "Man-Machine Language," such as Transaction Language 1 ("TL1"), is used. TL1 manages messages in such a manner that the messages are readable and writeable to a system administrator as well as machines within the network. Basically, TL1 provides a command line interface ("CLI") that enables a user to control a NE. TL1 also enables NEs to send event data to an Operations Support System or Element Management System. XML management traffic is converted into TL-1 commands at the GNE device 202. Subsequently, the TL-1 TID (TARP) specification is used to manage SNE devices 203 and the traffic is relayed to the appropriate SNE 204.

This approach requires that each XML command have a TL-1 equivalent. Furthermore, TL-1 event notifications from a SNE device are required to be converted at a GNE device into their XML form without loss of information 205. These requirements limit the capability and efficiency of the management of the NEs.

What is required is a system, device and method that addresses the above-described drawbacks in the prior art.

SUMMARY OF THE INVENTION

The present invention provides a management protocol that is an XML based protocol running over the TCP protocol. The XML/TCP protocol configures a connection and establishes authentication of the network connection for various communication between network devices, including NEs.

In one embodiment, a device and method are disclosed for communicating management messages and data within various networks. An Element Management Application is employed within a network and an XML Agent ("XMA") is implemented on each network element. At least one GNE is configured and an EMS-GNE connection is established. Tunneling of GNE proxy management traffic is permitted in order to address multiple SNE devices. If one of the GNEs becomes overloaded, a provision of delegating proxy functionality from the GNE device to one of the SNE devices is supported so as to provide connectivity to other multiple SNEs further downstream.

The management traffic comprises of XML packets that are exchanged between the EMS and the network elements in the form of request-response messages and/or unsolicited events.

In another embodiment of the invention, a management protocol is provided that includes connection management. The management protocol comprises a packet structure having multiple fields including fields for Proxy IP, Target IP, Proxy Port and Target Port. These fields are the controlling fields of the management protocol and determine the tunneling and chaining characteristics between multiple SNEs and GNE devices. Apart from the controlling fields, other fields within the packet structure include start and end data related to the frame. The packet structure may also include a control flag, a version of the protocol, length and type of the payload, event sequence number and sub channel ID.

In yet another embodiment of the invention, a communication network system having a management protocol is provided. The communication network system comprises an Element Management System operating within a network. A GNE device(s) are coupled with the Element Management System and a plurality of network elements are coupled to the GNE device(s). Each network element contains an XML agent that permits tunneling and chaining of proxy management traffic to address multiple subtending network element devices without the need for configuration at the EMS application or of any intermediate network devices. The intermediate network device includes network routers and network address translation devices or the like. Each network element is provided with an IP address.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system and a method for providing XML over TCP management protocol with tunneled proxy support and connection management are disclosed. In one embodiment, an EMS application is employed and an XML agent ("XMA") is implemented at each NE that supports XML/TCP. This XMA permits tunneling of proxy management traffic in order to address subtending network element ("SNE") devices via a publicly addressable gateway network element ("GNE") device without the need for configuration at the element management system ("EMS") software applications or of any intermediate network devices, such as network routers and network address translation ("NAT") devices.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different computing systems and devices. The embodiments of the present invention may be present in hardware, software or firmware. The best mode of the invention described in the specification illustrates the exemplary embodiment of the invention. It is understood that one skilled in art may modify or change the data used in the best mode of invention.

Reference in the specification to "one embodiment" or "an embodiment" means that a particular feature, characteristic, or function described in connection with the embodiment is included in at least one embodiment of the invention. The appearances of the phrase "in one embodiment" in various places in the specification are not necessarily all referring to the same embodiment.

A. Overview

Figure 3:
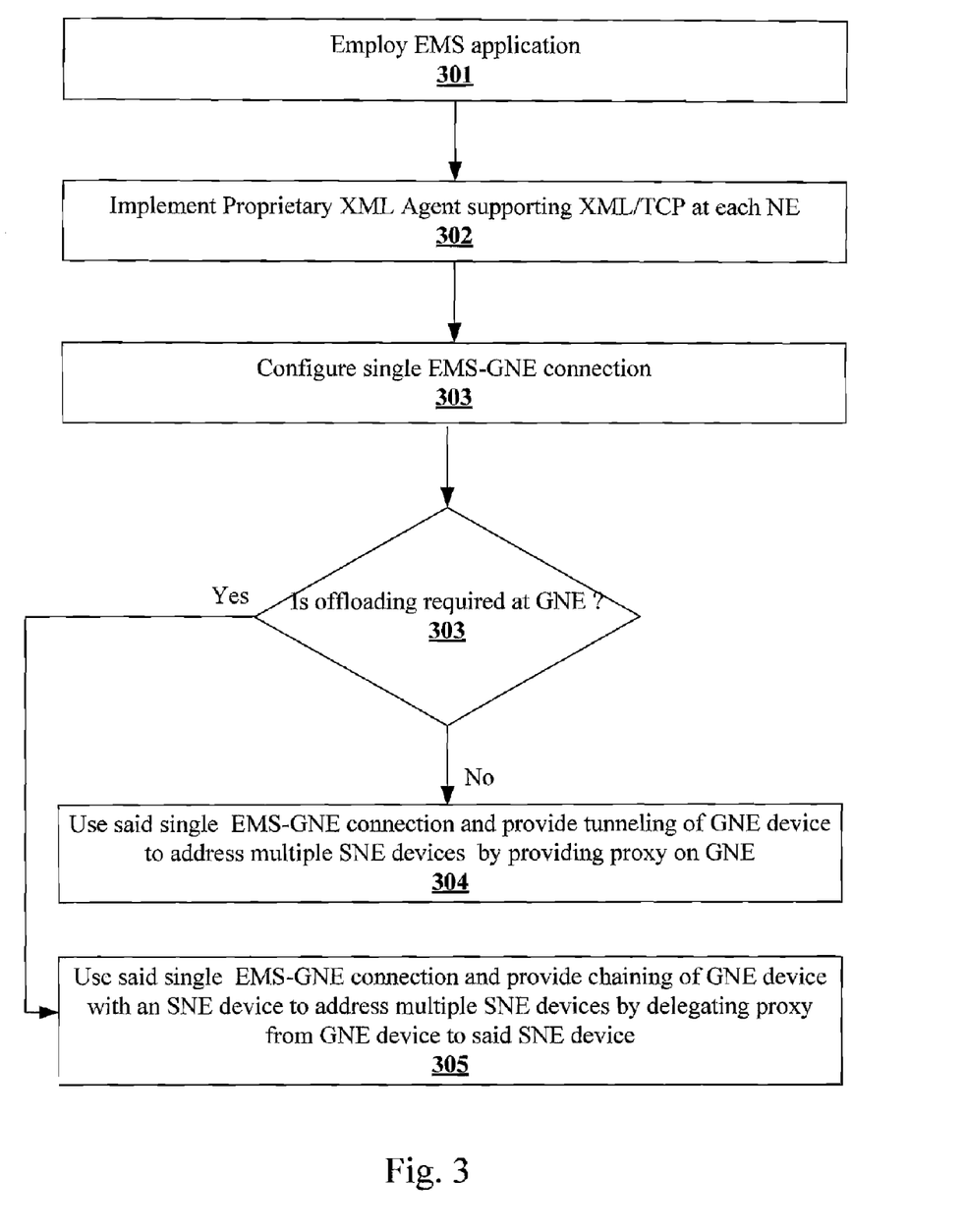
FIG. 3 is a flowchart illustrating a general method of addressing multiple network elements according to one embodiment of the invention.

FIG. 3 illustrates a general method for transmitting information using an XML over TCP management protocol with tunneled proxy support and management control according to one embodiment of the invention. The method may be initiated by employing EMS software applications 301 that manages one or more communications network elements. Typically, the EMS or Operations Support System ("OSS") manages the function and potential within each NE. Because an EMS application does not mange the traffic between different NEs in the network, a proprietary XML agent is employed 302. This XML agent is provided at each NE such that each NE may be capable of supporting XML/TCP protocol. The XML management traffic may include the information of request-response and unsolicited events.

Each NE is associated with a Gateway Network Element directly or indirectly. A GNE is coupled to the EMS via an EMS-GNE connection that may be configured to allow the relay of traffic from source to destination 303. One single EMS-GNE is responsible for multiple traffic relays between EMS and all NEs or SNEs. In other words, the GNE provides proxy services on an SNE device. The XMA monitors the TCP ports meant for communication of XML management information between the EMS application and a GNE. The XMA also monitors TCP ports meant for communication of XML management information between the EMS application and a SNE via the GNE. As a result, the XMA allows all proxy management traffic via the GNE to be processed at these ports. The XMA supporting XML/TCP protocol basically comprises a frame of multiple fields and is described in the later part of this description.

In a scenario of long-haul communication, the number of the network elements is quite large. It is oftentimes complex to mange the traffic between such a large number of network elements. To reduce the complexity of the management task, it is necessary to offload the GNE.

The XMA continuously checks whether the GNE is overloaded with too much traffic 304 and in such circumstances, the proxy service from a GNE is delegated to a subtending network element SNE to address multiple other SNE devices 306. In normal conditions when no offloading at said GNE is required, the EMS relays traffic to multiple SNE devices through the GNE 305.

As explained earlier, the relaying of traffic from the EMS to multiple SNE devices may be accomplished via an EMS-GNE connection. Even when the proxy services from GNE device is delegated to a SNE, no extra connection and configuration is required. Hence, the number of management connections needed between the EMS application and the GNE device is optimized. However, the flexibility for opening multiple internal channels to the SNE device as required is efficiently allowed.

B. Proprietary XML/TCP Protocol

Figure 4:
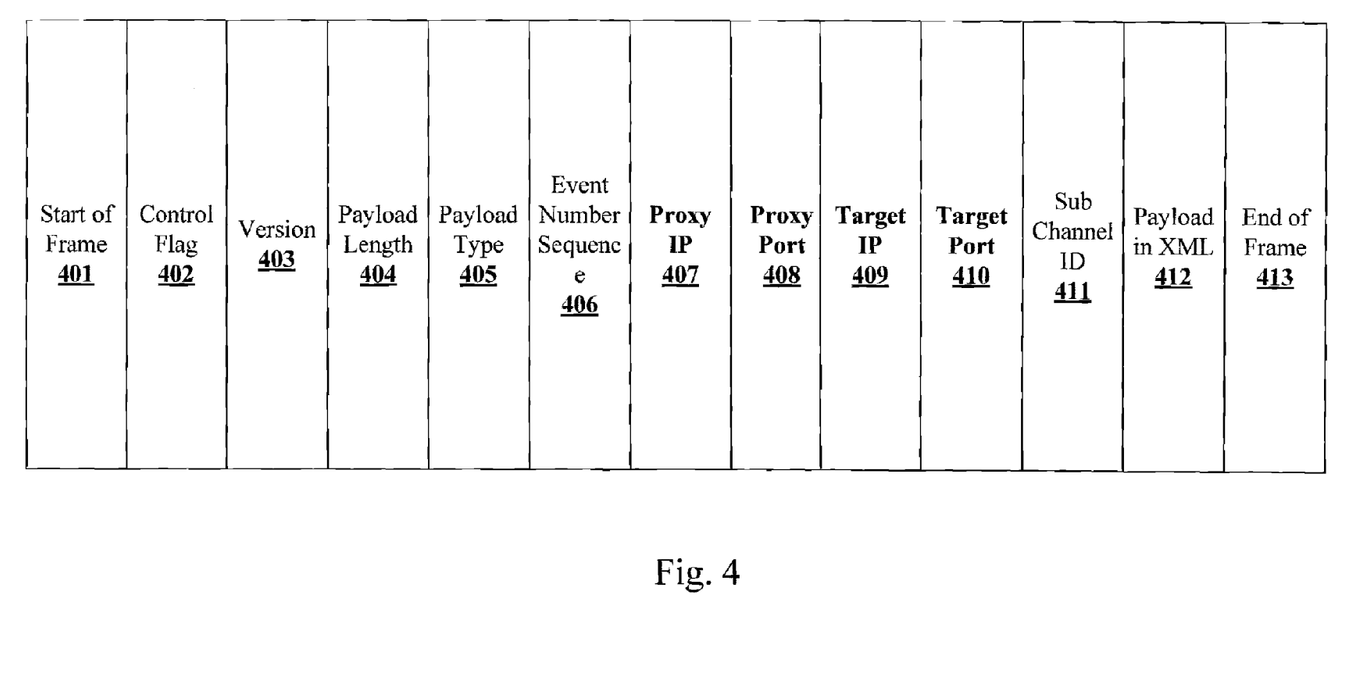
FIG. 4 shows a packet structure for sending information to various network elements using XML over TCP protocol according to one embodiment of the present invention.

FIG. 4 shows a structure of a proprietary XML/TCP protocol according to one embodiment of the invention. As mentioned earlier, the constituents of proprietary XML/TCP protocol are framed in a packet comprising multiple fields as described below according to one embodiment of the invention:

Start of Frame 401: This field indicates the start of transmission packet containing a hexadecimal sequence pattern. The value of this field is chosen such that it bears a non-printable ASCII character which happens to fall outside the character set transmitted between the network elements and the EMS application.

Control Flag 402: The value of this field may be chosen as 0x01 to indicate intent on part of the client to close the connection to the target XMA. A value of 0x02 may be used to loop back packets at the XMA without the need for authentication at the network element. It may also be employed to check the connectivity between the EMS and the XMA. A value of 0x03 may be used to retrieve network element version information without the need for authentication at the network element. Thus, it may be employed by the EMS application to determine version compatibility for system management purposes.

Version 403: This field is used to specify the version of the XML over TCP protocol currently in use.

Payload Length 404: This value indicates the actual size of the management payload which is in XML format.

Payload Type 405: This value indicates the type of payload transported in the packet. The value may be designated as a "Don't Care" for both the network element and the EMS application.

Event Sequence Number 406: It is employed by a network element to indicate the current event number per session that has been sent out by the network element and is used by the EMS application to recover "lost" events during network congestion or excess stress on the NE. This value increases monotonically on the network element on a per session basis starting from a value of 1. Upon reaching a certain limit it wraps back to 1 once again. For instance, for a 2 byte event sequence number, the limit will be set to a value of 65535 (i.e. the maximum unsigned short integer value supported in 2 bytes).

Proxy IP 407: This is the IP address of the network element that is to proxy the XML packet to the intended target destination. In one embodiment, a value of zero indicates that the receiving XMA is to act as the proxy. A value other than zero indicates that the network element with the specified IP address is to act as a proxy. This field also permits the chaining of two proxy agents.

Proxy Port 408: This is the port corresponding to the network element with the IP address in the field "Proxy IP", that provides the proxy service. This field may be processed in conjunction with the "Proxy IP" field.

Target IP 409: This is the IP address of the network element to which the XML packet is destined. This field may be processed in conjunction with the "Proxy IP" field.

Target Port 410: This is the port corresponding to the network element with the IP address in the field "Target IP", that provides the XML management service. This field may be processed in conjunction with the "Target IP" field.

Sub Channel ID 411: This field is used to specify the sub channel identification pertaining to the connection from the GNE device to the SNE device. In one embodiment, the Sub Channel ID permits multiple connections from a GNE device to the same SNE device via the same EMS device to GNE device connection. A value of zero indicates an existing GNE-SNE device connection is to be reused.

Payload in XML 412: This value gives payload in XML transported in the packet

End of Frame 413: This field indicates the end of frame. Similar to the start of frame, the value chosen is that of non-printable ASCII, which happens to fall outside the character set transmitted between the network elements (NEs) and the EMS application. For example, this field may have a value of 0xffffffff hexadecimal sequence pattern.

One skilled in the art will recognize that the above-described structure may be modified, shortened or lengthened and still remain within the scope and intent of the present invention.

C. Management of Multiple SNE Devices Over the Same EMS-GNE Connection

Figure 5:
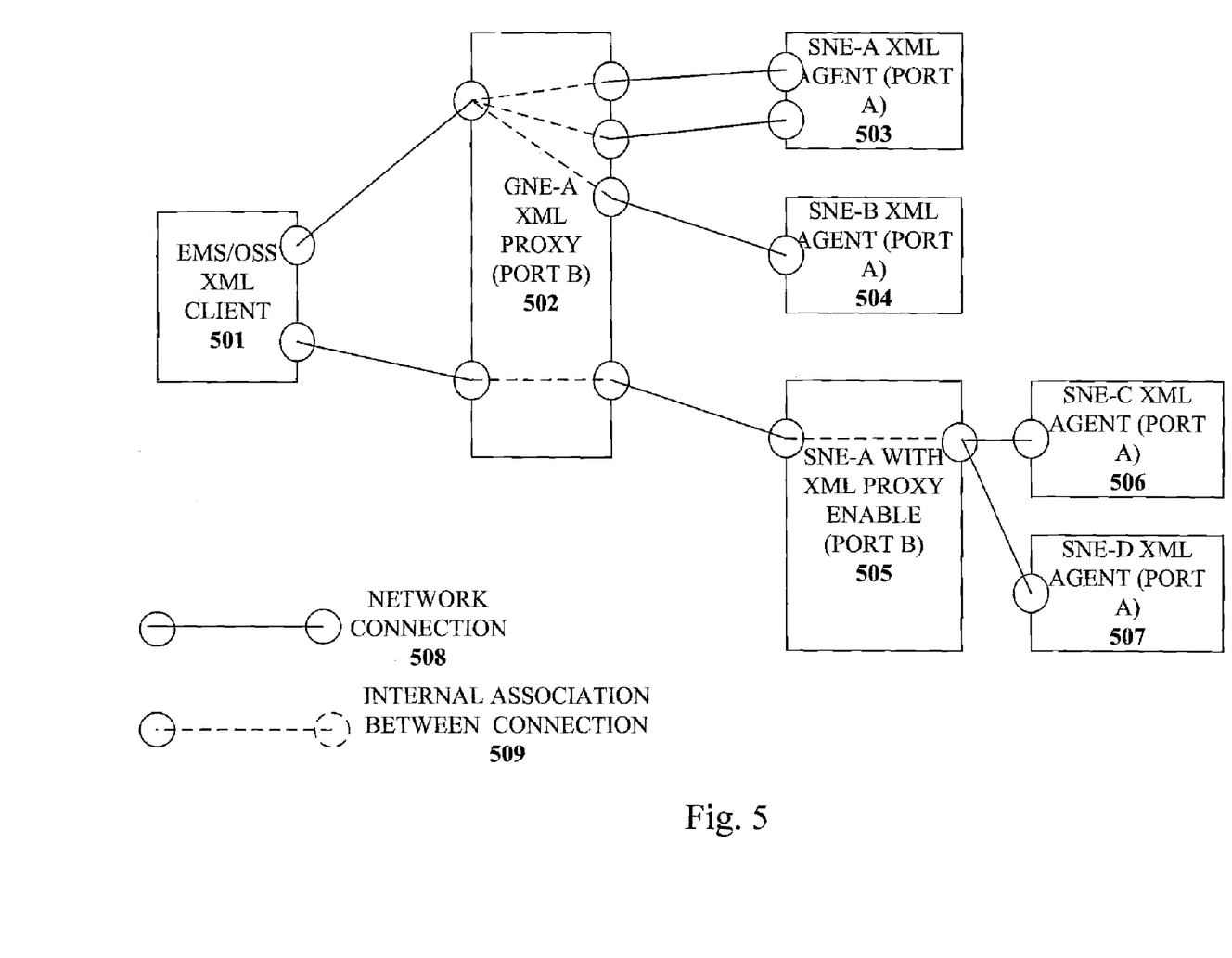
FIG. 5 is a chart illustrating an exemplary method for transmitting information using an XML over TCP protocol according to one embodiment of the present invention.

FIG. 5 shows an exemplary method for managing multiple SNE devices over the same EMS 501-GNE 502 connection (GNE-A 502 to SNE-A 503 and SNE-B 504) according to one embodiment of the invention. Multiple connections between a GNE device and a given SNE device (GNE-A 502 to SNE-A 502) as well as chaining a GNE device and SNE device to provide proxy services on a SNE device (GNE-A 502 and lower SNE-A 505) are also shown.

Various embodiments of the present invention support the tunneled proxy management in a simple and scalable fashion. All the fields in the transport header are encoded in network byte order.

In one embodiment of the invention, a GNE XMA receives a packet at its proxy service port that receives the Proxy IP value. If the value of "Proxy IP" is zero, then the GNE device 502 provides a proxy connection to the SNE device with IP equal to "Target IP" and Port equal to "Target Port".

The XML management traffic between the EMS 501 application and the SNE device occur via this connection. If the GNE device 502 receives a packet with a new value of "Target IP", then a new connection is setup between the GNE device and SNE device utilizing the same EMS-GNE connection. For instance, the SNE device 504 may use the same connection allowing multiple SNE devices to be managed by tunneling proxy management traffic over the single EMS-GNE device connection.

A non-zero "SubChannel ID" value to an existing SNE device 505 can be used to setup a parallel connection between the GNE device 502 and SNE device 506 or 507 (e.g. one for request-response and the other for unsolicited events), while at the same time keeping only a single EMS-GNE device connection. These mechanisms optimize the number of management connections needed between the EMS application and the GNE device while giving the flexibility for opening multiple internal channels to the SNE device as required.

If a non-zero Proxy IP is given, the GNE device 502 relays the connection to the network element 505 with IP "Proxy IP"—that network element 505 provides the same proxy management services as explained above. Thus, this embodiment of the invention allows a GNE device 502 and SNE device 505 to be chained to provide proxy management services to a third network element (NE) 506 and 507. Various embodiments of the invention supports the connection models described below:

1. For each EMS-SNE communication, a separate connection is established with the GNE device, which in turn proxies the connection to the SNE device. This model may be preferable for EMS to network element connections where a large amount of management traffic is expected.

2. A single EMS-GNE connection is used to proxy traffic to multiple SNE devices. This model may be preferable for EMS to network element connections where the management traffic is expected to be small.

3. Where GNE-SNE device bandwidth and/or network buffers are limited, multiple GNE-SNE device connections for a given SNE device, multiplexed over a single EMS-GNE connection may be suitable to increase overall network throughput.

4. A given internal SNE device can be used to proxy traffic to other SNE devices. The GNE device delegates it proxy functionality to the given SNE device. This model may be preferred in cases where it is desirable to offload some of the proxy management functionality from the GNE device to a SNE device owing to network resource constraints on the GNE device. It also lends itself as a solution where the network is internally segmented into different routing domains and where the chained GNE device and SNE device are linked via internal static routes.

D. Method for Transmitting Traffic Using XML Over TCP

Figure 6:
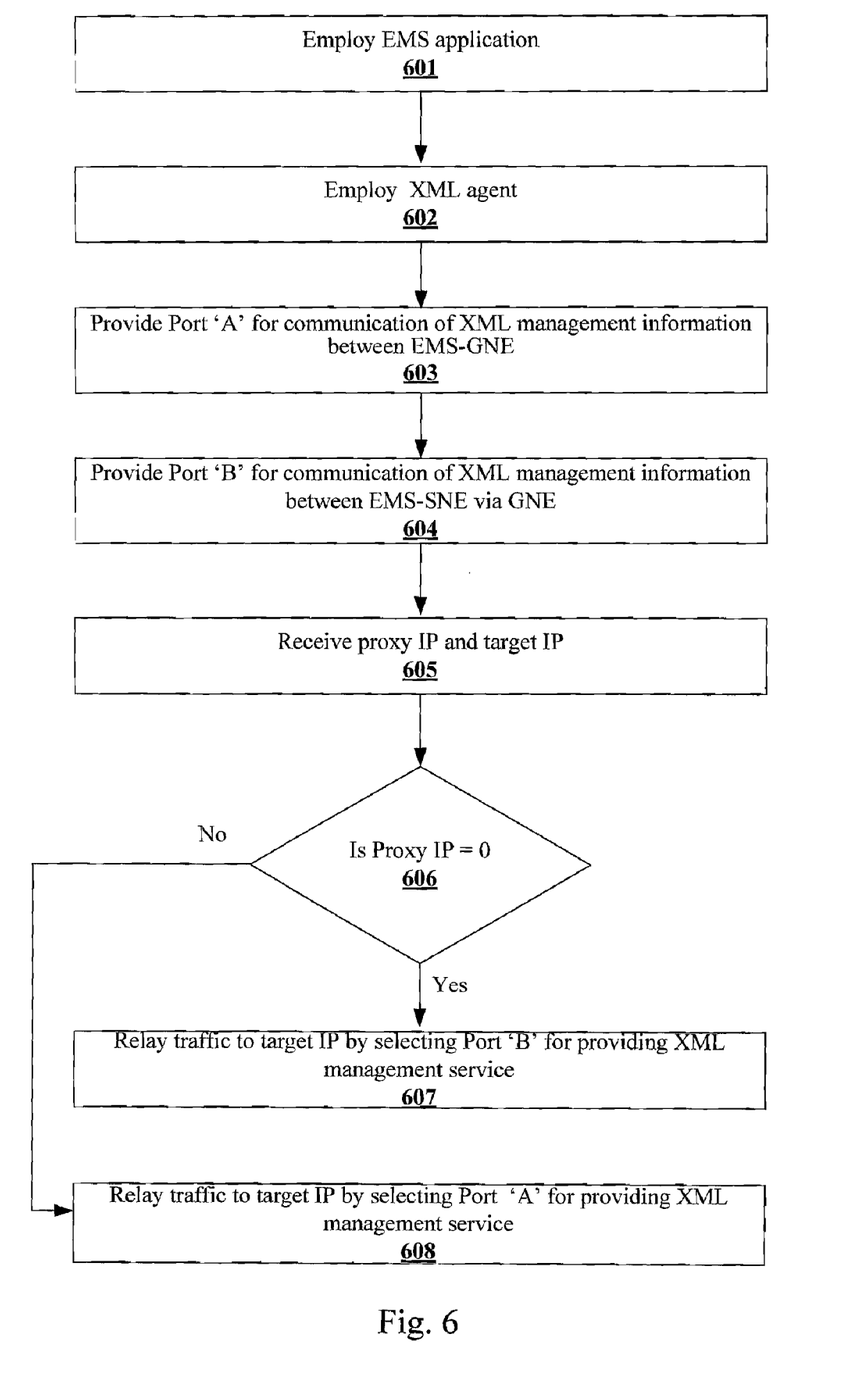
FIG. 6 is a flowchart illustrating a method a method for transmitting information using an XML over TCP protocol according to one embodiment of the invention.

FIG. 6 is a detailed flowchart illustrating a method for transmitting network traffic using XML over TCP according to one embodiment of the invention. An element management system software application is employed within a network 601 in order to manage one or more communication network elements. The traffic between different NEs in the network is managed by employing a proprietary XML agent supporting the XML/TCP protocol 602 described above. A first port, Port A, is provided for communication of XML management information between the EMS and a GNE 603. A second port, Port B, is provided for communication of XML management information between EMS and SNE via GNE 604. The XMA monitors these two TCP ports (i.e. Port A and Port B) and thereby monitors the XML management information between the EMS application and a GNE, as well as between the EMS application and a SNE via the GNE.

As explained earlier, in order to manage large number of network elements, it may often be required to offload the GNE. To address this issue, the XMA continuously checks whether the GNE is overloaded with too much network traffic. This is accomplished by first receiving the Proxy IP and the Target IP 605 and analyzing the values of received Proxy IP 606. In one embodiment of the invention, when the value of the received Proxy IP is found to be zero, the proxy service from GNE is delegated to a subtending network element SNE to address multiple other SNE devices 607. If the proxy IP bears a non zero value, traffic is relayed to multiple SNE devices through the GNE 608.

The foregoing description of the invention has been described for purposes of clarity and understanding. It is not intended to limit the invention to the precise form disclosed. Various modifications may be possible within the scope and equivalence of the appended claims.

I claim:

1. A method comprising:
    employing an element management system ("EMS") application within a network;
    implementing an XML agent on a plurality of network elements, the plurality of network elements including a subtending network element that monitors a port to identify management data from the EMS application;
    configuring a connection between the EMS application and a gateway network element;
    delegating a proxy from the gateway network element to the subtending network element, such that the subtending network element is addressed by the EMS application;
    tunneling proxy management traffic to the subtending network element from the gateway network element;
    supplying the proxy management traffic from the subtending network element to remaining ones of the network elements; and
    transmitting packets having a plurality of communication data fields, wherein the plurality of communication data fields comprise information related to a Proxy IP, a Target IP, a Proxy Port and a Target Port, the plurality of communication data fields being indicative of tunneling and chaining characteristics between the subtending network element and the gateway network element.

2. The method of claim 1 wherein the port receives data provided by the EMS to the gateway network element.

3. The method of claim 2 wherein, the port is a first port, the XML agent monitors a second port that receives data provided by the EMS to the subtending network element.

4. The method of claim 1 wherein the plurality of communication data fields comprise information related to a start and end of a frame.

5. The method of claim 1 wherein the plurality of communication data fields comprise a control flag.

6. The method of claim 1 further including controlling an optical long-haul network, the optical long-haul network being included in the network.

7. The method of claim 1 further including monitoring an amount of traffic on the gateway network element.

8. The method of claim 1 wherein said delegating the proxy is in response to an amount of traffic on the gateway network element exceeding a threshold level.

9. A network system having a management protocol comprising:
    a plurality of network elements, each of which having a corresponding one of a plurality of XML agents, one of the plurality of network elements being a subtending network element;
    an element management system ("EMS") that controls the plurality of network elements; and
    a gateway network element communicating with the EMS through which traffic is sent to the plurality of network elements;
    wherein the subtending network element is communicatively coupled to the gateway network element and has an associated proxy designation that receives tunneled proxy management traffic, such that the subtending network element supplies the tunneled proxy management traffic to remaining ones of the plurality of network elements, and the subtending network element transmits packets having a plurality of communication data fields, wherein the plurality of communication data fields comprise information related to a Proxy IP, a Target IP, a Proxy Port and a Target Port, the plurality of communication data fields being indicative of tunneling and chaining characteristics between the subtending network element and the gateway network element.

10. The network system of claim 9 wherein the proxy designation is delegated to the subtending network element in response to an amount of traffic on the gateway network element exceeding a threshold.

11. The network system of claim 9 wherein the EMS supplies XML management traffic, the plurality of XML agents monitor a first port and a second port for the XML management traffic.

12. The network system of claim 11 wherein the XML management traffic includes request-response and unsolicited events commands.

13. The network system of claim 11 wherein the XML management traffic is transmitted over a TCP protocol.

14. The network system of claim 9 wherein the network system includes an optical long-haul network.

15. A non-transitory computer-readable storage medium comprising program instructions which are computer-executable to implement:
    employing an element management system ("EMS") application within the network;
    implementing an XML agent on a plurality of network elements, the plurality of network elements including a subtending network element that monitors a first port to identify management data from the EMS application;

configuring a connection between the EMS application and a gateway network element;

delegating a proxy from the gateway network element to the subtending network element the subtending network element is addressed by the EMS application;

tunneling proxy management traffic to the subtending network element from the gateway network element;

supplying the proxy management traffic from the subtending network element to remaining ones of the network elements; and transmitting packets having a plurality of communication data fields, wherein the plurality of communication data fields comprise information related to a Proxy IP, a Target IP, a Proxy Port and a Target Port, the plurality of communication data fields being indicative of tunneling and chaining characteristics between the subtending network element and the gateway network element.

16. The storage medium of claim 15 wherein the first port receives data provided by the EMS to the gateway network element.

17. The storage medium of claim 15 wherein the communication protocol an optical long-haul network.

18. The storage medium of claim 15 wherein the step of delegating the proxy is performed in response to an amount of traffic on the gateway network element exceeding a threshold level.

* * * * *